(12) United States Patent
Singleton, IV et al.

(10) Patent No.: US 11,663,028 B2
(45) Date of Patent: *May 30, 2023

(54) COMPUTER SYSTEM PROVIDING VIRTUAL COMPUTING SESSIONS THROUGH VIRTUAL DELIVERY AGENT LEASING WITH ENHANCED POWER SAVINGS AND CONNECTIVITY AND RELATED METHODS

(71) Applicant: CITRIX SYSTEMS, INC., Fort Lauderdale, FL (US)

(72) Inventors: Leo C. Singleton, IV, Fort Lauderdale, FL (US); Georgy Momchilov, Parkland, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 194 days.

This patent is subject to a terminal disclaimer.

(21) Appl. No.: 17/110,503

(22) Filed: Dec. 3, 2020

(65) Prior Publication Data

US 2021/0117222 A1 Apr. 22, 2021

Related U.S. Application Data

(63) Continuation of application No. 16/241,047, filed on Jan. 7, 2019, now Pat. No. 10,860,361.

(51) Int. Cl.
*G06F 9/455* (2018.01)
*G06F 1/3246* (2019.01)
*G06F 1/329* (2019.01)
*G06F 9/50* (2006.01)
*H04L 67/14* (2022.01)

(52) U.S. Cl.
CPC .......... *G06F 9/45558* (2013.01); *G06F 1/329* (2013.01); *G06F 1/3246* (2013.01); *G06F 9/5077* (2013.01); *G06F 9/5094* (2013.01); *H04L 67/14* (2013.01); *G06F 2009/45595* (2013.01)

(58) Field of Classification Search
None
See application file for complete search history.

(56) References Cited

U.S. PATENT DOCUMENTS

| | | |
|---|---|---|
| 7,724,657 B2 | 5/2010 | Rao et al. |
| 8,141,075 B1 | 3/2012 | Chawla et al. |
| 8,555,274 B1 | 10/2013 | Chawla et al. |

(Continued)

OTHER PUBLICATIONS

Georgy Momchilov "HDX Adaptive Transport and EDT: ICA™s New Default Transport Protocol (Part II)" https://www.citrix.com/blogs/2017/11/20/hdx-adaptive-transport-and-edt-icas-new-default-transport-protocol-part-ii; Nov. 20, 2017; pp. 7.

*Primary Examiner* — Eric C Wai

(57) ABSTRACT

A computing device may include a memory and a processor cooperating with the memory to generate connection leases for a plurality of client devices. The client devices may be configured to request virtual computing sessions from virtual delivery appliances in accordance with respective connection leases. Virtual delivery appliances within a first group may be configured to operate during off-peak hours, and virtual delivery appliances within a second group different than the first group may be configured not to operate during the off-peak hours. The processor may generate each connection lease to include at least one of the virtual delivery appliances from the first group.

20 Claims, 8 Drawing Sheets

(56) References Cited

U.S. PATENT DOCUMENTS

| | | |
|---|---|---|
| 9,009,327 B2 | 4/2015 | Adhya et al. |
| 9,021,475 B2 | 4/2015 | Nimmagadda et al. |
| 9,176,744 B2 | 11/2015 | Lee |
| 9,426,227 B2 | 8/2016 | Bell |
| 9,538,345 B2 | 1/2017 | Sah et al. |
| 2009/0106571 A1 | 4/2009 | Low et al. |
| 2013/0219468 A1 | 8/2013 | Bell |
| 2016/0232025 A1 | 8/2016 | Speak et al. |
| 2016/0373520 A1 | 12/2016 | Kumar et al. |
| 2017/0185437 A1 | 6/2017 | Thomas |
| 2020/0162560 A1 | 5/2020 | Singleton, IV et al. |

70

|  | Selecting 5 VDAs evenly from the possible 20 (no always-on) | Selecting 4 VDAs from 19, then including the always-on VDA in the last lease slot |
|---|---|---|
| Probability of Connection | 95.5% | 97.2% |
| Average number of connection attempts | 1.27 | 1.41 |
| Load balancing unevenness (difference between most- and least-loaded VDA) | 7.26 users | 7.03 users |

*FIG. 7*

COMPUTER SYSTEM PROVIDING VIRTUAL COMPUTING SESSIONS THROUGH VIRTUAL DELIVERY AGENT LEASING WITH ENHANCED POWER SAVINGS AND CONNECTIVITY AND RELATED METHODS

RELATED APPLICATIONS

This application is a continuation of U.S. application Ser. No. 16/241,047 filed Jan. 7, 2019, which is hereby incorporated herein in its entirety by reference.

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server may include one or more hypervisors (virtual machine managers) to create and maintain multiple virtual machines, software to manage the hypervisor(s), a connection broker, and software to provision and manage the virtual desktops.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktop or application sessions, along with additional computing devices to provide management and customer portals for the cloud system.

SUMMARY

A computing device may include a memory and a processor cooperating with the memory to generate connection leases for a plurality of client devices. The client devices may be configured to request virtual computing sessions from virtual delivery appliances in accordance with respective connection leases. Virtual delivery appliances within a first group may be configured to operate during off-peak hours, and virtual delivery appliances within a second group different than the first group may be configured not to operate during the off-peak hours. The processor may generate each connection lease to include at least one of the virtual delivery appliances from the first group.

In an example embodiment, each of the connection leases may comprise an ordered list of virtual delivery appliances, and each client computing device may be configured to sequentially request virtual computing sessions from the virtual delivery appliances in its respective ordered list from a highest order to a lowest order until a virtual computing session is established. More particularly, the lowest order virtual delivery appliance in the ordered list may be from the first group of virtual delivery appliances. In accordance with another example, each client computing device may have a respective user account associated therewith, and the processor may generate connection leases for client computing devices having a same user account associated therewith that share a same ordered list of virtual delivery appliances.

In one embodiment, each of the connection leases may further include at least one virtual delivery appliance from the second group. Furthermore, the virtual delivery appliances within the first group may be further configured to operate in an always-on mode. By way of example, 20% or less of the virtual delivery appliances may be assigned to the first group.

The virtual computing sessions may comprise virtual machine sessions, and the virtual delivery appliances may be configured to connect multiple client computing devices to each virtual machine session, for example. In other example implementations, the virtual computing sessions may comprise at least one of virtual desktop sessions and virtual application sessions.

A related method may include generating connection leases for a plurality of client devices at a computing device, with the client devices being configured to request virtual computing sessions from virtual delivery appliances in accordance with respective connection leases. Virtual delivery appliances within a first group may be configured to operate during off-peak hours, and virtual delivery appliances within a second group different than the first group may be configured not to operate during the off-peak hours. Furthermore, generating may comprise generating each connection lease to include at least one of the virtual delivery appliances from the first group.

A related non-transitory computer-readable medium may have computer-executable instructions for causing a processor to perform steps including generating connection leases for a plurality of client devices at a computing device, with the client devices being configured to request virtual computing sessions from virtual delivery appliances in accordance with respective connection leases. Virtual delivery appliances within a first group may be configured to operate during off-peak hours, and virtual delivery appliances within a second group different than the first group may be configured not to operate during the off-peak hours. Furthermore, generating may comprise generating each connection lease to include at least one of the virtual delivery appliances from the first group.

BRIEF DESCRIPTION OF THE DRAWINGS

FIG. 7 is a table comparing connection probabilities for example lease configurations with and without VDAs designated for operating during off-peak hours.

DETAILED DESCRIPTION

The present description is made with reference to the accompanying drawings, in which example embodiments are shown. However, many different embodiments may be used, and thus the description should not be construed as limited to the particular embodiments set forth herein. Like numbers refer to like elements throughout, and prime notation may be used to indicate similar elements in different embodiments.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
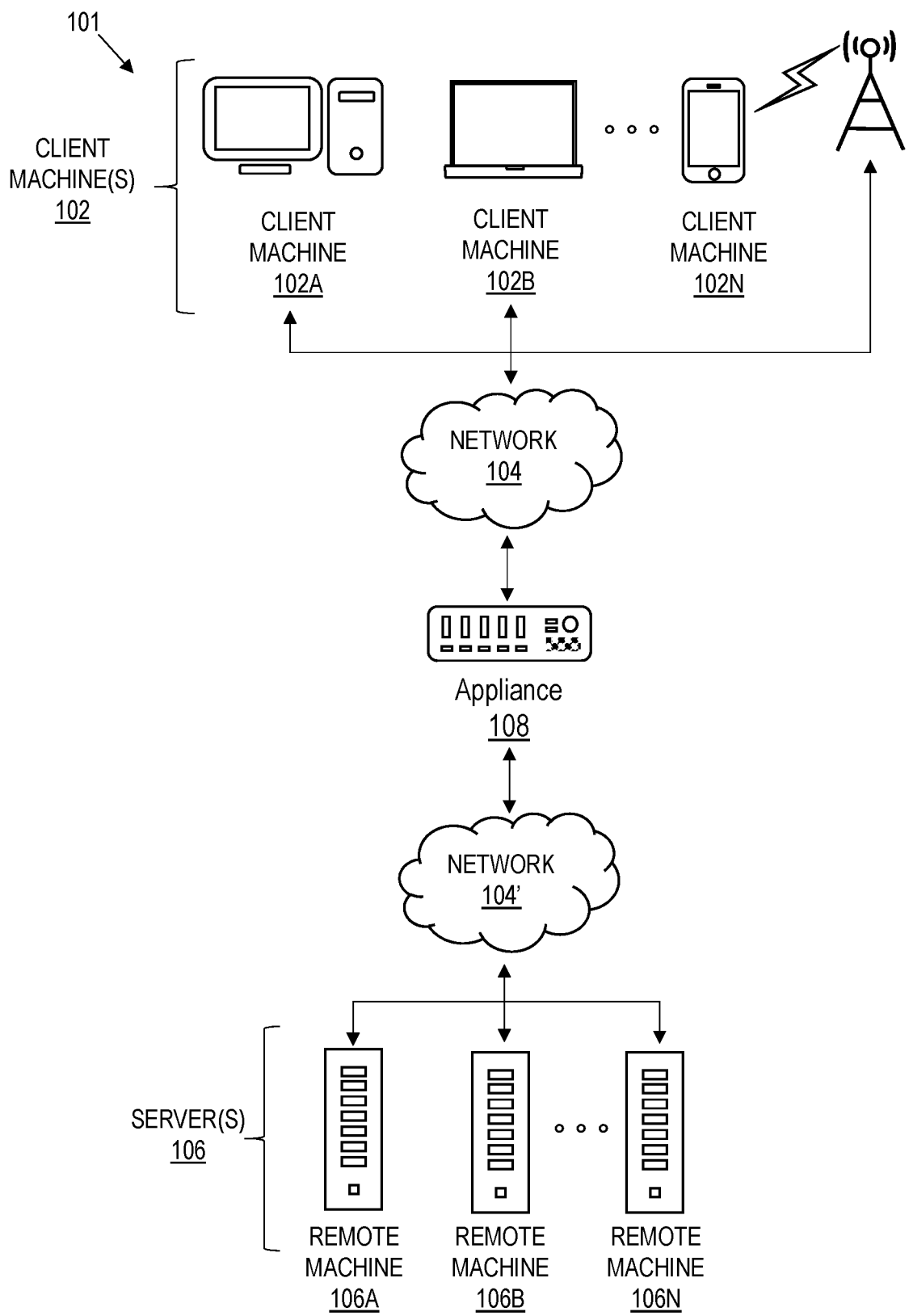
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer or Transport Layer Security (TLS) Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
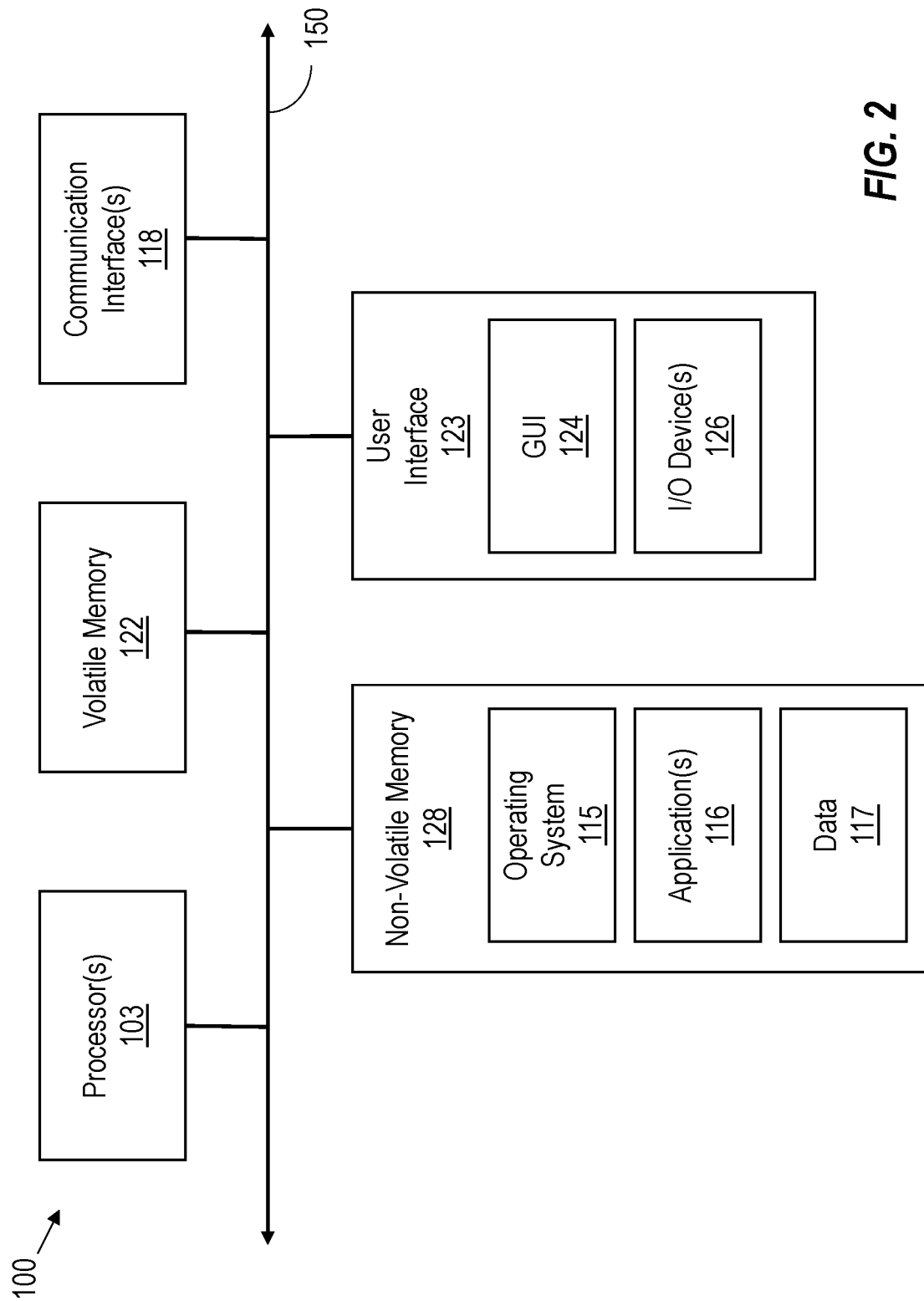
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
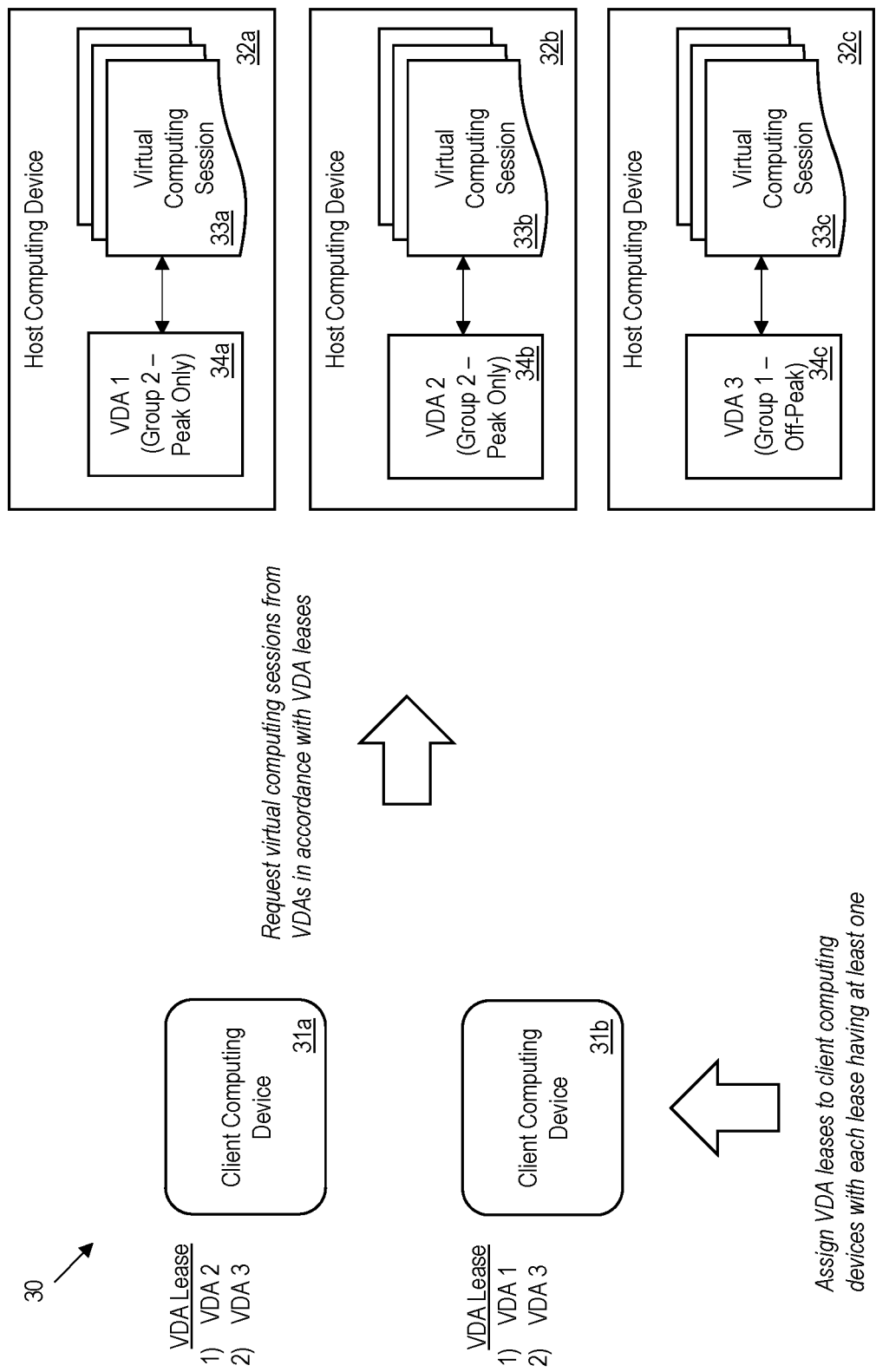
FIG. 3 is a schematic block diagram of a computer system providing connections to virtual computing sessions using virtual delivery agent (VDA) leases having at least one VDA operating during off-peak hours.
Figure 8:
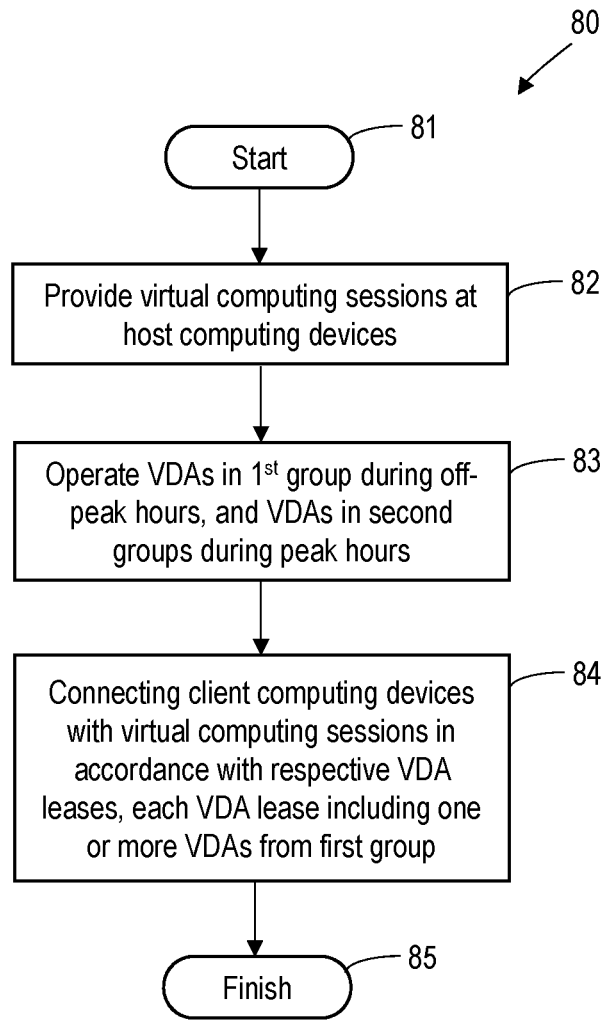
FIG. 8 is a flow diagram illustrating method aspects associated with the system of FIG. 3.

Turning to FIG. 3 and the flow diagram 80 of FIG. 8, a system 30 providing client computing devices access to virtual computing sessions through connection leasing, yet with enhanced power saving capabilities and high connection probabilities, is now described. The system 30 illustratively includes a plurality of client computing devices 31a, 31b (e.g., smartphones, tablet computers, laptop computers, desktop computers, etc.), and a plurality of host computing devices 32a-32c each configured to provide virtual computing sessions 33a-33c for the client computing devices. Each host computing device 32a-32c illustratively includes a virtual delivery agent (VDA) 34a-34c associated therewith configured to connect the client computing devices with the virtual computing sessions. While only two client computing devices 31a, 31b and three hosting computing devices 32a-32c are shown in the illustrated example, it will be appreciated that any number of such computing devices may be used in different embodiments. Moreover, it will also be appreciated that the host computing devices 32a-32c and VDAs 34a-34c may be implemented in the cloud and/or on-premises in different embodiments.

By way of background, Citrix XenApp and XenDesktop are products which allow client computing devices to remotely access virtual computing sessions, such as virtual desktop sessions and virtual application sessions. In some embodiments, multiple virtual computing sessions may be hosted by a virtual machine. By way of example, the virtual application sessions may provide access to shared computing applications, including hosted applications, Web/Software as a Service (SaaS) applications, etc. Virtual desktop sessions may include both shared applications and hosted operating system components. In the case of XenApp and XenDesktop, a VDA enables connections to the applications and desktops, and is typically installed on the server/machine that runs the XenApp and/or XenDesktop virtual application/desktop sessions for the user (although it may be installed on a different machine in some implementations). The VDA enables the machines to register with delivery controllers and manage the connection to a user device. While the techniques described herein may be implemented using products such as XenApp and XenDesktop, for example, it will be appreciated that they may be implemented using other computing systems as well.

Connection leasing is a way to provide relatively high availability by authorizing client computing devices to connect to one of many VDAs via a signed lease document.

However, one challenge is ensuring that the client computing devices can connect on nights and weekends and/or holidays (i.e., off-peak hours) when most VDAs are powered off to provide power savings. The present approach provides a technical solution to this problem of providing desired connection probabilities through VDA leases yet while still allowing for VDA power cycling during off-peak times to advantageously provide significant power savings to thereby improve the operation of a virtualized computing environment.

Beginning at Block 81, the host computing devices 32a-32c provide virtual computing sessions 33a-33c for the client computing devices 31a, 31b, at Block 82. However, a first group of the VDAs (here including only the VDA 34c) is configured to operate during off-peak hours, while VDAs within a second group different than the first group (here the VDAs 34a-34b) are configured not to operate during the off-peak hours, at Block 83. That is, the VDAs 34a-34b (and optionally the host computing devices 32a, 32b they run on) are configured to power off or run in a reduced power mode during off-peak hours, which may include weekdays outside of normal business hours (e.g., after 5 PM and before 9 AM), and all day on holidays and weekends, for example. Of course, off-peak hours may be selected differently for different entities or organizations in different embodiments.

Yet, the VDAs within the first group (i.e., the VDA 34c in the present example) are configured to run during some or all of the off-peak hours, and may optionally be run during some or all of the peak hours. That is, VDAs in the first group could be configured to operate (i.e., in a normal operational mode) only during off-peak hours, or they may be configured to also run during some or all of the peak hours. The VDAs 34a-34c connect the client computing devices 31a, 31b to the virtual computing sessions 33a-33c as requested in accordance with the VDA leases, and as the VDAs are available based upon whether they are in the first or second group and whether it is peak or off-peak hours, at Block 84. The method of FIG. 8 illustratively concludes at Block 85. In an example embodiment, VDA leases may be assigned to the client computing devices 31a, 31b by brokers or other network administrator computers when the client computing device registers with the system 30, for example. In one example configuration, the VDAs in the first group may be operated in an "always-on" fashion, providing full operational capabilities twenty-four hours a day.

Furthermore, the client computing devices 31a, 31b are configured to request virtual computing sessions from the VDAs 34a-34c in accordance with respective VDA leases, and each VDA lease includes at least one of the VDAs from the first group. In the illustrated example, the client computing device 31a is assigned a VDA lease including the VDAs 34b (second/peak group) and 34c (first/off-peak group), while the client computing device 31b is assigned a VDA lease including the VDAs 34a (second/peak group) and 34c (first/off-peak group).

Figure 4:
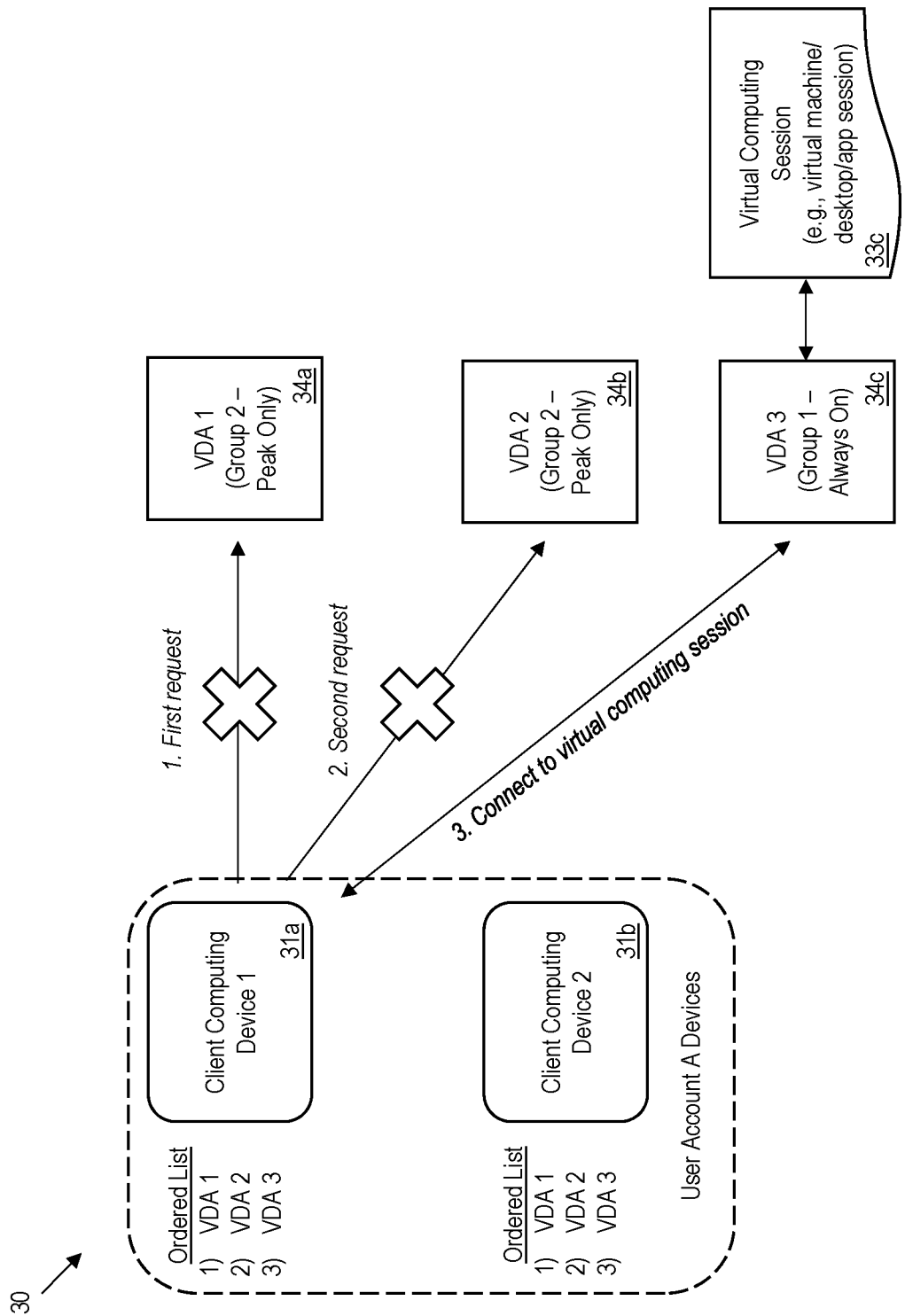
FIG. 4 is a schematic block diagram of an example implementation of the system of FIG. 3.

Referring additionally to FIG. 4, in some implementations each of the VDA leases may include an ordered list of VDAs, with each client computing device 31a, 31b being configured to sequentially request virtual computing sessions from the VDAs 34a-34c in its respective ordered list from a highest order to a lowest order until a virtual computing session is established. Furthermore, each of the client computing devices 31a, 31b has a respective user account associated therewith, and in the present example the client computing devices have a same user account (User Account A) associated therewith, and they share the same ordered list of VDAs. For example, the client computing device 31a could be User A's laptop computer, while the client computing device 31b is User A's smartphone, etc.

In the present case, the ordered list of VDAs within the VDA lease includes, in order from highest ranked to lowest ranked: (1) VDA 34a (peak only); (2) VDA 34b (peak only); and (3) VDA 34c (always-on). Thus, in this example, the client computing devices 31a, 31b attempt to establish virtual computing sessions with the VDA 34a, and if that is unsuccessful then with VDA 34b, and if that is unsuccessful then finally with VDA 34c. This is the case shown in the illustrated example, in which the last VDA 34c in the ordered list connects the client computing device 31a with a virtual computing session 33c. This is the scenario that would occur during off-peak hours (when the VDAs 34a-34b are powered down or in a low power state), or during peak hours when the VDAs 34a-34b are overloaded, a connection is down, etc.

Note that there is at least one peak only VDA (here the VDAs 34a, 34b) in the ordered list, and at least one always-on VDA (here the VDA 34c), which in this example is positioned at the end of the ordered list. Positioning the off-peak/always-on VDA at the end of the ordered list may be advantageous in that it provides a more even distribution of processing resources over time, as the peak only VDAs 34a, 34b will receive more traffic during peak hours, and the always-on VDA 34c will receive more traffic during off-peak hours. However, it will be appreciated that the off-peak/always-on VDAs need not be positioned at the end of the ordered list in all embodiments. Moreover, any number of VDAs from the peak/off-peak groups may be included in the VDA leases in different embodiments. It should also be noted that different VDA leases (with different ordered lists) may be assigned to different user accounts, which provides a passive load balancing approach since different client computing devices will initially look to different VDAs for a virtual computing session.

Further details on connecting client computing devices to virtual computing sessions through VDAs using an ordered list approach are set forth in application Ser. No. 16/194,823 filed Nov. 20, 2018, now U.S. Pat. No. 11,115,478 which is also assigned to the present Applicant and is hereby incorporated herein in its entirety by reference.

The foregoing will be further understood with reference to various implementation examples demonstrating the enhanced connection probabilities that may be obtained using the above-described VDA leasing approach. Before describing the examples, the following background on typical approaches for brokering virtual computing sessions is now provided. The brokering of a pooled desktop is typically achieved with a probabilistic approach to guarantee a certain level of availability (i.e., a successful connection to a published desktop), for instance three nines (99.999%), four nines (99.9999%), etc. In this context, this is why a Connection Lease (CL) contains multiple VDAs.

Upon request to connect to a pooled desktop, in the case of the Citrix Workspace App (CWA), it will try to connect to the VDAs from the CL list of VDAs, one-by-one until a VDA is available (meaning powered on and not in use). When the end-user launches a desktop (from a Delivery Group containing pooled machines), the CWA will attempt to connect to a VDA by doing a quick ICA/CGP ping to check if it is available. If not, the CWA will go to the next one in the list of VDAs and so on. For cost reasons, only a subset of the available VDAs are typically powered on (and idle) at a specific time—taking advantage of the XenApp/XenDesktop Smart Scale Feature. Typically, customers may power on only 10-20% of available VDAs on nights and weekends, when usage is low.

In such a scenario, if we distribute VDAs evenly in connection leases, we can calculate the probability of connecting successfully. Assuming the probability for the VDAs in the CL list to be available is $P_a$, then the probability to connect successfully to a VDA (by trying successively) is defined by the following recurrence relation (where n is the number of VDAs to try to connect to):

$$P_{n+1}=P_n+(1-P_n)\times P_a,$$

With $P_1=P_a$.
This can be changed to:

$$P_{n+1}=P_n\times(1-P_a)+P_a,$$

which resolves to:

$$P_n=1-(1-P_a)^n.$$

A quick calculation shows how many VDAs (=n) are required in the CL list to guarantee two nines, three nines, etc. probability to connect successfully to a VDA. The following table assumes that only 20% of the available VDAs are powered on (and available/idle), which translates to $P_a=0.2$

| Number of VDAs | Probability of finding a VDA to connect to |
| --- | --- |
| 1 | 0.2 |
| 11 | 0.914101 |
| 21 | 0.990777 |
| 31 | 0.999010 |
| 42 | 0.999915 |
| 52 | 0.999991 |

It will be appreciated that achieving even three 9's reliability requires a large number of VDAs in every lease (i.e., 30+). This could have a large impact on performance as leases would be large, and the CWA may have to try many connections before succeeding.

Figures 5A, 5B:
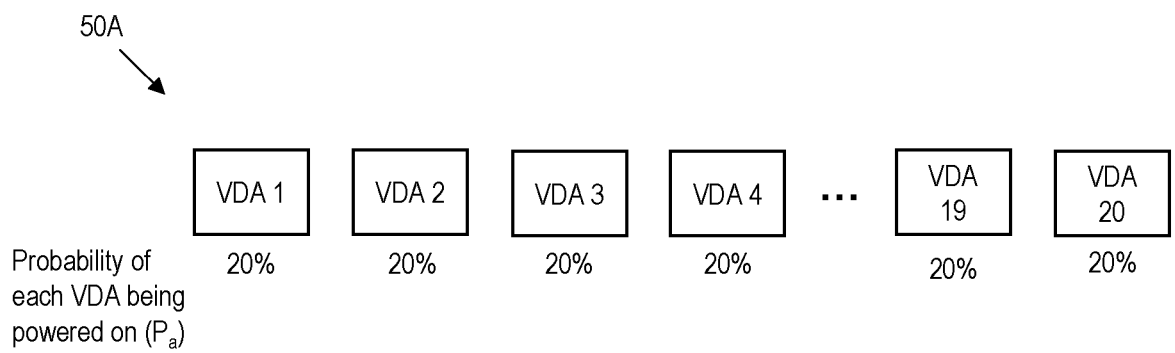
FIG. 5A is a schematic block diagram illustrating a conventional approach to VDA assignment for connecting client computing devices to virtual computing sessions.
FIG. 5B is a chart of example lease assignments for respective user accounts for the VDAs of FIG. 5A, along with connection probabilities resulting from the given lease assignments.

An example of the typical approach to issuing leases in a system 50A with twenty available VDAs, all having an equal probability of being powered on, and the VDAs being distributed evenly to the leases, is shown in FIG. 5A and the associated chart 50B of FIG. 5B. This results in a 20% probability for each VDA of being powered on at any given time. For the case of four users, each user will have approximately a 95% connection probability.

Instead of assuming that all VDAs have the same probability of being powered on, the present approach pre-selects those that will remain on during off-peak hours (or always-on). Continuing with the above example, the 20% of VDAs that stay powered on during nights and weekends may advantageously be selected ahead of time. Then, rather than distributing VDAs evenly in the leases, the leases are made up of a mix of VDAs powered on during peak periods (to ensure adequate load balancing during high-usage periods), and also VDAs from the preselected 20% (to ensure availability during low-usage periods), as noted above. Of course, different percentages of off-peak/always-on VDAs may be used in different embodiments.

Figures 6A, 6B:
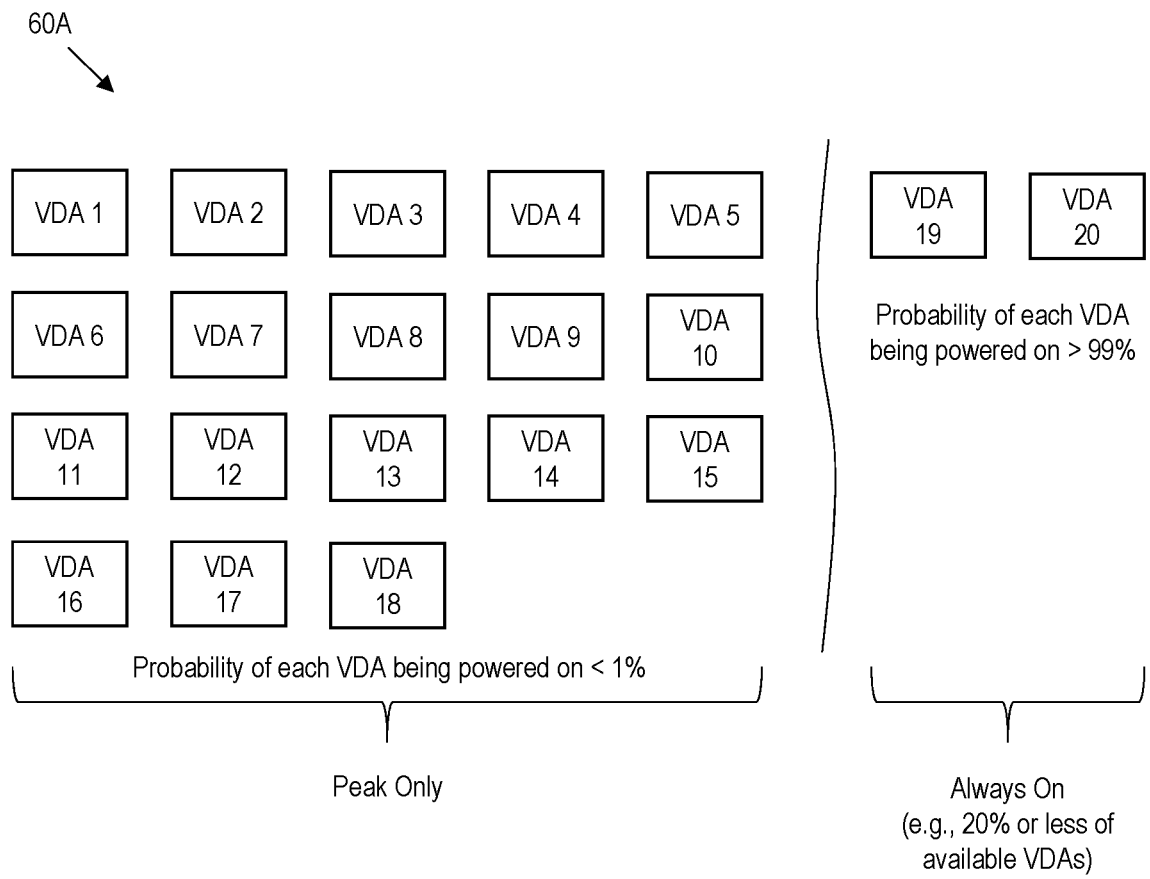
FIG. 6A is a schematic block diagram illustrating an example grouping of available VDAs for an embodiment of the system of FIG. 3.
FIG. 6B is a chart of example lease assignments for respective user accounts for the VDAs of FIG. 6A, along with connection probabilities resulting from the given lease assignments.

Turning now to FIGS. 6A-6B, an example implementation of a system 60A using the present approach where 10% of the available VDAs are pre-selected for operations during off-peak hours is now described. More particularly, in this example VDAs 1-18 are pre-selected for peak only operation, while the VDAs 19-20 (i.e., 2 of the available 20 VDAs, or 10%) are pre-selected for off-peak operation (here always-on operation). As described above, when issuing leases, one of the always-on VDAs is included in every user's lease, as shown in the chart 60B of FIG. 6B. In the peak only group, there is <1% probability of each VDA being powered on at a given time, but in the always-on group there is >99% probability of these two VDAs (VDA 19 and 20) being powered on at any given time. As seen in FIG. 6B, the result is that for each user's VDA lease, there is a >99% probability that the user will be connected to a virtual computing session by including one of the always-on VDAs in the lease, a 4%+ improvement over the approach noted above with the same number of VDAs and users but no pre-selection of the always-on VDAs. Of course, it will be appreciated that more always-on VDAs could be designated and assigned to user leases to increase the probability of connection even higher, but at the expense of some power savings, so the appropriate amount of VDAs to be pre-selected for a given application may be different. As a general guide, 20% or less of the available VDAs may be pre-selected for off-peak operation in a typical application, but a higher percentage may be chosen in some cases as desired.

The present approach to connection leasing plus power management also advantageously applies to pooled VDI (i.e., one user per VM) as well as RDS workloads (multiple users per VM). With RDS, configurations are more complicated as multiple users can share the same VM (up to a limit), so a simulation was performed to validate the effectiveness of the present approach. The results of the simulation are shown in the table 70 of FIG. 7. Assuming 20 VDAs capable of handling 10 users each (for a total of 200 users), a 10% idle pool, and 5 VDAs in a lease, the probability of connection with no pre-selected always-on VDAs is 95.5%, but with a single pre-selected always-on VDA in each lease the probability rises to 97.2%. Similarly, the average number of connection attempts changes from 1.27 to 1.41, and the load balancing unevenness changes from 7.26 users to 7.03 users.

It will therefore be appreciated that, without increasing the number of VDAs in a lease, the present approach provided for nearly half the connection failure rate, improved load balancing, and only caused a slight increase in connection time due to a higher number of connection attempts before finding an unloaded VDA. As noted above, in larger environments, it would also be possible to include more than one always-on VDA in leases to further increase connection probability.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:
1. A computing device comprising:
a memory and a processor cooperating with the memory to generate connection leases for a plurality of client devices, the client devices being configured to request virtual computing sessions from virtual delivery appliances in accordance with respective connection leases;
wherein virtual delivery appliances within a first group are configured to operate during off-peak hours, and virtual delivery appliances within a second group different than the first group are configured not to operate during the off-peak hours;

wherein the processor generates each connection lease to include at least one of the virtual delivery appliances from the first group;

wherein the processor is further configured to direct the virtual delivery appliances to establish the virtual computing sessions based upon the connection leases.

2. The computing device of claim 1 wherein each of the connection leases comprises an ordered list of virtual delivery appliances, and wherein each client computing device is configured to sequentially request virtual computing sessions from the virtual delivery appliances in its respective ordered list from a highest order to a lowest order until a virtual computing session is established.

3. The computing device of claim 2 wherein the lowest order virtual delivery appliance in the ordered list is from the first group of virtual delivery appliances.

4. The computing device of claim 2 wherein each client computing device has a respective user account associated therewith; and wherein the processor generates connection leases for client computing devices having a same user account associated therewith that share a same ordered list of virtual delivery appliances.

5. The computing device of claim 1 wherein each of the connection leases further includes at least one virtual delivery appliance from the second group.

6. The computing device of claim 1 wherein the virtual delivery appliances within the first group are further configured to operate in an always-on mode.

7. The computing device of claim 1 wherein 20% or less of the virtual delivery appliances are assigned to the first group.

8. The computing device of claim 1 wherein the virtual computing sessions comprise virtual machine sessions, and wherein the virtual delivery appliances are configured to connect multiple client computing devices to each virtual machine session.

9. The computing device of claim 1 wherein the virtual computing sessions comprise at least one of virtual desktop sessions and virtual application sessions.

10. A method comprising:
generating connection leases for a plurality of client devices at a computing device, the client devices being configured to request virtual computing sessions from virtual delivery appliances in accordance with respective connection leases;
wherein virtual delivery appliances within a first group are configured to operate during off-peak hours, and virtual delivery appliances within a second group different than the first group are configured not to operate during the off-peak hours;
wherein generating comprises generating each connection lease to include at least one of the virtual delivery appliances from the first group; and
directing, at the computing device, the virtual delivery appliances to establish the virtual computing sessions based upon the connection leases.

11. The method of claim 10 wherein each of the connection leases comprises an ordered list of virtual delivery appliances, and wherein each client computing device is configured to sequentially request virtual computing sessions from the virtual delivery appliances in its respective ordered list from a highest order to a lowest order until a virtual computing session is established.

12. The method of claim 11 wherein the lowest order virtual delivery appliance in the ordered list is from the first group of virtual delivery appliances.

13. The method of claim 11 wherein each client computing device has a respective user account associated therewith; and wherein generating further comprises generating connection leases for client computing devices having a same user account associated therewith that share a same ordered list of virtual delivery appliances.

14. The method of claim 10 wherein each of the connection leases further includes at least one virtual delivery appliance from the second group.

15. The method of claim 10 wherein the virtual delivery appliances within the first group are further configured to operate in an always-on mode.

16. A non-transitory computer-readable medium having computer-executable instructions for causing a processor of a computing device to perform steps comprising:
generating connection leases for a plurality of client devices, the client devices being configured to request virtual computing sessions from virtual delivery appliances in accordance with respective connection leases;
wherein virtual delivery appliances within a first group are configured to operate during off-peak hours, and virtual delivery appliances within a second group different than the first group are configured not to operate during the off-peak hours;
wherein generating comprises generating each connection lease to include at least one of the virtual delivery appliances from the first group; and
directing the virtual delivery appliances to establish the virtual computing sessions based upon the connection leases.

17. The non-transitory computer-readable medium of claim 16 wherein each of the connection leases comprises an ordered list of virtual delivery appliances, and wherein each client computing device is configured to sequentially request virtual computing sessions from the virtual delivery appliances in its respective ordered list from a highest order to a lowest order until a virtual computing session is established.

18. The non-transitory computer-readable medium of claim 17 wherein the lowest order virtual delivery appliance in the ordered list is from the first group of virtual delivery appliances.

19. The non-transitory computer-readable medium of claim 17 wherein each client computing device has a respective user account associated therewith; and wherein generating further comprises generating connection leases for client computing devices having a same user account associated therewith that share a same ordered list of virtual delivery appliances.

20. The non-transitory computer-readable medium of claim 16 wherein each of the connection leases further includes at least one virtual delivery appliance from the second group.

* * * * *